US011949172B2

(12) United States Patent
Zhang et al.

(10) Patent No.: US 11,949,172 B2
(45) Date of Patent: Apr. 2, 2024

(54) ANTENNA SYSTEM AND TERMINAL

(71) Applicant: Honor Device Co., Ltd., Shenzhen (CN)

(72) Inventors: Xuefei Zhang, Shenzhen (CN); Lei Wang, Shanghai (CN); Kun Feng, Shanghai (CN); Chi Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 1026 days.

(21) Appl. No.: 16/528,919

(22) Filed: Aug. 1, 2019

(65) Prior Publication Data

US 2019/0356052 A1 Nov. 21, 2019

Related U.S. Application Data

(63) Continuation of application No. 15/113,407, filed as application No. PCT/CN2015/070283 on Jan. 7, 2015, now Pat. No. 10,411,354.

(30) Foreign Application Priority Data

Jan. 23, 2014 (CN) ......................... 201410030800.8

(51) Int. Cl.
*H01Q 1/24* (2006.01)
*H01Q 5/328* (2015.01)
(Continued)

(52) U.S. Cl.
CPC ........... *H01Q 9/0421* (2013.01); *H01Q 1/241* (2013.01); *H01Q 1/243* (2013.01); *H01Q 5/328* (2015.01);
(Continued)

(58) Field of Classification Search
CPC ...... H01Q 9/0421; H01Q 9/0442; H01Q 9/42; H01Q 1/241; H01Q 1/243; H01Q 5/328; H01Q 5/378
See application file for complete search history.

(56) References Cited

U.S. PATENT DOCUMENTS 7,099,690 B2 * 8/2006 Milosavljevic ........ H01Q 1/243 343/702
10,084,235 B2 9/2018 Li et al.
(Continued)

FOREIGN PATENT DOCUMENTS

CN 1538556 A 10/2004
CN 1778012 A 5/2006
(Continued)

*Primary Examiner* — Awat M Salih
(74) *Attorney, Agent, or Firm* — SLATER MATSIL, LLP

(57) ABSTRACT

An antenna system includes an antenna body having one or more connection points between the antenna body and a ground; a tunable component having a changeable operating parameter that is a capacitance or a inductance, wherein the antenna body is connected to the tunable component through a first connection point; and a first filter, wherein the first filter are connected to the antenna body; wherein the first filter is connected in parallel with the tunable component, wherein a first end of the first filter is connected to the antenna body through the first connection point, and a second end of the first filter is connected to the ground, and wherein the first filter presents a high impedance characteristic in a low frequency band, and presents a low impedance characteristic in a high frequency band.

17 Claims, 10 Drawing Sheets

(51) Int. Cl.
*H01Q 5/378* (2015.01)
*H01Q 9/04* (2006.01)
*H01Q 9/42* (2006.01)

(52) U.S. Cl.
CPC ........... *H01Q 5/378* (2015.01); *H01Q 9/0442* (2013.01); *H01Q 9/42* (2013.01)

(56) References Cited

U.S. PATENT DOCUMENTS

| | | | | |
|---|---|---|---|---|
| 2004/0207559 | A1 | 10/2004 | Milosavljevic | |
| 2006/0262015 | A1 | 11/2006 | Thornell-Pers et al. | |
| 2007/0069956 | A1* | 3/2007 | Ozkar | H01Q 5/00 343/702 |
| 2011/0183633 | A1* | 7/2011 | Ohba | H04B 1/40 343/722 |
| 2013/0016024 | A1* | 1/2013 | Shi | H01Q 5/371 29/729 |
| 2013/0038494 | A1 | 2/2013 | Kuonanoja | |
| 2013/0307742 | A1 | 11/2013 | Hu et al. | |
| 2014/0028521 | A1 | 1/2014 | Bauder et al. | |
| 2014/0057578 | A1* | 2/2014 | Chan | H04B 1/18 455/73 |
| 2014/0071008 | A1* | 3/2014 | Desclos | H01Q 19/021 343/745 |
| 2014/0313087 | A1 | 10/2014 | Jiang et al. | |
| 2014/0333495 | A1 | 11/2014 | Vazquez et al. | |
| 2014/0333496 | A1* | 11/2014 | Hu | H01Q 1/243 343/745 |
| 2014/0334362 | A1 | 11/2014 | Granger-Jones | |
| 2015/0147980 | A1 | 5/2015 | Larsen et al. | |
| 2015/0236741 | A1 | 8/2015 | Ma et al. | |

FOREIGN PATENT DOCUMENTS

| | | | |
|---|---|---|---|
| CN | 200947468 | Y | 9/2007 |
| CN | 102355223 | A | 2/2012 |
| CN | 202759016 | U | 2/2013 |
| CN | 103209003 | * | 7/2013 |
| CN | 103209003 | A | 7/2013 |
| CN | 103337717 | A | 10/2013 |
| CN | 103534873 | A | 1/2014 |
| CN | 103794871 | A | 5/2014 |
| CN | 203645705 | U | 6/2014 |
| EP | 2190063 | A1 | 5/2010 |
| TW | 201310772 | A | 3/2013 |

* cited by examiner

ANTENNA SYSTEM AND TERMINAL

CROSS-REFERENCE TO RELATED APPLICATIONS

This application is a continuation of U.S. patent application Ser. No. 15/113,407, filed on Jul. 21, 2016, which is a national phase filing under section 371 of PCT/CN2015/070283, filed Jan. 7, 2015, which claims priority to Chinese Patent Application No. 201410030800.8, filed on Jan. 23, 2014. All of the aforementioned patent applications are hereby incorporated by reference in their entireties.

TECHNICAL FIELD

The present invention relates to the antenna field, and specifically, to an antenna system and a terminal.

BACKGROUND

With development and application of a fourth generation long term evolution (4G-LTE) technology, antenna bandwidth of a terminal product needs to cover more frequency bands. According to a user demand on portability and aesthetic appeal of the product, an antenna is required to occupy as little space as possible. However, miniaturization and broadband are in contradiction. Therefore, in such a background, a tunable antenna becomes one of trend technologies to resolve the contradiction problem. The tunable antenna means that different inductance components or capacity components are mounted to a "sensitive position" of the antenna, or a switch between connection and disconnection is implemented, so as to change an impedance characteristic of the antenna. The foregoing "sensitive position" mainly includes an excitation point of the antenna, a ground point of the antenna, a wire of an antenna body, or the like.

In an existing tunable antenna, a tunable component such as a switch component is connected in series to a ground point of the antenna; a back end of the switch component is connected to an inductor or a capacitor that varies in inductance or capacitance, and is then connected to the ground. After the tunable component is connected in series, switching between "a state of multiple inductors, a state of multiple capacitors, and a state of directly connection to the ground" may be performed according to an antenna design requirement. With switching of the switch, a ground point is connected to different components, and an impedance characteristic at an excitation point is correspondingly affected; therefore, a change in an operating frequency band of the antenna may be implemented. Finally, a sum of frequency bands that can be covered in multiple change states is total bandwidth that the tunable antenna can finally cover.

In the prior art, bandwidth of an antenna at a low frequency is extended by using a tunable component. Though an operating frequency band of the antenna at the low frequency changes as expected when each tunable component switches or changes, a frequency response of the antenna in a high frequency band also changes accordingly after each tunable component switches or changes or when the tunable component is in each operating state, and the change at a high frequency is generally irregular.

SUMMARY

In view of this, an objective of the present invention is to resolve a problem that high frequency impedance is affected and thus disorderly changes when low frequency bandwidth is tuned.

A first aspect of this application provides an antenna system, where the antenna system includes an antenna body, a tunable component, a first filter and/or a second filter, where the antenna body is connected to the tunable component. The first filter is connected in parallel to the tunable component, and the first filter presents a high impedance characteristic in a low frequency band, and presents a low impedance characteristic in a high frequency band. The second filter is connected in series between the antenna body and the tunable component, a first end of the second filter is connected to the antenna body, a second end of the second filter is connected to the tunable component, and the second filter presents a low impedance characteristic in a low frequency band, and presents a high impedance characteristic in a high frequency band.

With reference to the first aspect, in a first possible implementation manner of the first aspect, the antenna system includes the antenna body, the tunable component, and the first filter, and further includes a parasitic element, where the tunable component is connected to the antenna body by using the parasitic element, and a first end of the first filter is connected to the antenna body by using the parasitic element.

With reference to the first aspect, in a second possible implementation manner of the first aspect, the antenna system includes the antenna body, the tunable component, and the second filter, and further includes a parasitic element, where the first end of the second filter is connected to the antenna body by using the parasitic element, and the tunable component is connected to the antenna body by sequentially using the second filter and the parasitic element.

With reference to the first aspect, in a third possible implementation manner of the first aspect, the antenna system includes the antenna body, the tunable component, the first filter, and the second filter, and further includes a parasitic element, where a first end of the first filter is connected to the antenna body by using the parasitic element. The first end of the second filter is connected to the antenna body by using the parasitic element, and the tunable component is connected to the antenna body by sequentially using the second filter and the parasitic element.

With reference to the first possible implementation manner of the first aspect or the third possible implementation manner of the first aspect, in a fourth first possible implementation manner of the first aspect, the first filter is a single capacitor or an inductive-capacitive (LC) network that includes an inductor and a capacitor.

With reference to the second possible implementation manner of the first aspect or the third possible implementation manner of the first aspect, in a fifth possible implementation manner of the first aspect, the second filter is a single inductor or an LC network that includes an inductor and a capacitor.

With reference to the first aspect, in a sixth possible implementation manner of the first aspect, the antenna body is an inverted F antenna (IFA) antenna or a monopole antenna.

A second aspect of this application provides a terminal, where the terminal includes an antenna system, and the antenna system includes an antenna body, a tunable component, a first filter and/or a second filter. The antenna body is connected to the tunable component, the first filter is connected in parallel to the tunable component, and the first filter presents a high impedance characteristic in a low frequency band, and presents a low impedance characteristic in a high frequency band. The second filter is connected in series between the antenna body and the tunable component, a first end of the second filter is connected to the antenna body, a second end of the second filter is connected to the tunable component, and the second filter presents a low impedance characteristic in a low frequency band, and presents a high impedance characteristic in a high frequency band.

With reference to the second aspect, in a first possible implementation manner of the second aspect, the antenna system includes the antenna body, the tunable component, and the first filter, and further includes a parasitic element, where the tunable component is connected to the antenna body by using the parasitic element, and a first end of the first filter is connected to the antenna body by using the parasitic element.

With reference to the second aspect, in a second possible implementation manner of the second aspect, the antenna system includes the antenna body, the tunable component, and the second filter, and further includes a parasitic element. The first end of the second filter is connected to the antenna body by using the parasitic element, and the tunable component is connected to the antenna body by sequentially using the second filter and the parasitic element.

With reference to the second aspect, in a third possible implementation manner of the second aspect, the antenna system includes the antenna body, the tunable component, the first filter, and the second filter, and further includes a parasitic element, where a first end of the first filter is connected to the antenna body by using the parasitic element, the first end of the second filter is connected to the antenna body by using the parasitic element, and the tunable component is connected to the antenna body by sequentially using the second filter and the parasitic element.

With reference to the first possible implementation manner of the second aspect or the third possible implementation manner of the second aspect, in a fourth possible implementation manner of the first aspect, the first filter is a single capacitor or an LC network that includes an inductor and a capacitor.

With reference to the second possible implementation manner of the second aspect or the third possible implementation manner of the second aspect, in a fifth possible implementation manner of the first aspect, the second filter is a single inductor or an LC network that includes an inductor and a capacitor.

With reference to the second aspect, in a sixth possible implementation manner of the second aspect, the antenna body is an IFA antenna or a monopole antenna.

The first filter presents high impedance in a low frequency band, presents low impedance in a high frequency band, and is connected in parallel to a bypass of the tunable component. Therefore, when the antenna operates in a low frequency band, due to high impedance blocking by the filter, a radio frequency current at a ground point can pass only through a tunable component branch. When the antenna operates in a high frequency band, which is equivalent to being directly connected to the ground point because the filter presents low impedance, the radio frequency current is connected to the ground point mainly through a filter branch. In this case, disturbance to a high frequency current is fairly small even if a status of the tunable component branch changes, thereby ensuring that a change of the tunable component affects only the low frequency band, and significantly weakening impact on the high frequency band. Alternatively, the second filter may be disposed, where the second filter presents low impedance in a low frequency band, presents high impedance in a high frequency band, and is connected in series between the antenna body and the tunable component. Therefore, when the antenna operates in a low frequency band, a radio frequency current at a ground point is not affected by the filter and is directly connected to the tunable component. When the antenna operates in a high frequency band, a high impedance characteristic of the filter blocks connection of the radio frequency current to the tunable component. Because this path is equivalent to being in a disconnected state, a status change of the tunable component does not affect current flow between the antenna and the ground point, thereby ensuring that the change of the tunable component affects only the low frequency band, and significantly weakening impact on the high frequency band. Alternatively, both the first filter and the second filter may be disposed. The second filter presents low impedance in a low frequency band, presents high impedance in a high frequency band, and is connected in series between the antenna body and the tunable component. The first filter presents high impedance in a low frequency band, presents low impedance in a high frequency band, and is connected in parallel to a bypass of a path connecting in series the second filter and the tunable component. Therefore, when the antenna operates in a low frequency band, due to high impedance blocking by the first filter, a radio frequency current at a ground point can pass only through the series path that includes the second filter and the tunable component. Because the second filter presents low impedance at a low frequency, the radio frequency current is not affected by the second filter and is directly connected to the tunable component. When the antenna operates in a high frequency band, which is equivalent to being directly connected to the ground point because the first filter presents low impedance, the radio frequency current is connected to the ground point mainly through a first filter branch. In addition, the second filter presents high impedance that blocks connection of the radio frequency current to the tunable component, which further ensures that the radio frequency current is connected to the ground point only through the first filter branch. In this case, disturbance to a high frequency current is fairly small even if a status of a tunable component branch changes, thereby ensuring that a change of the tunable component affects only the low frequency band, and significantly weakening impact on the high frequency band.

In a tunable antenna broadband technology of LTE-4G, each state of a tunable component correspondingly covers a frequency band of an antenna. When the antenna operates in a particular frequency band, performance at another frequency may be ignored; that is, if the antenna currently operates in a low frequency band, performance of the antenna in a high frequency band may be ignored because an entire terminal operates only in the low frequency band. However, after a carrier aggregation technology emerges in LTE-4G, a terminal system can simultaneously operate in two frequency bands, such as a low frequency band and a high frequency band. Because the terminal system needs to enhance bandwidth of a wireless network by increasing a spectrum width, an antenna needs to simultaneously maintain good performance in two specified frequency bands, that is, a specified low frequency band and a specified high frequency band. However, it is a relatively difficult project for an antenna in a current antenna system to maintain good performance in both a low frequency range and a high frequency band by using a status of only one tunable component. In the present invention, the project becomes less difficult. In the antenna system, a first filter or a second filter or both are disposed, and characteristics of the first filter and the second filter are set. It can be learned from above that, disposing of the first filter and/or the second filter can achieve an objective that high frequency impedance basically remains in a same state during low frequency tuning, and resolve a problem that the high frequency impedance is affected and thus disorderly changes when the antenna system tunes low frequency bandwidth.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
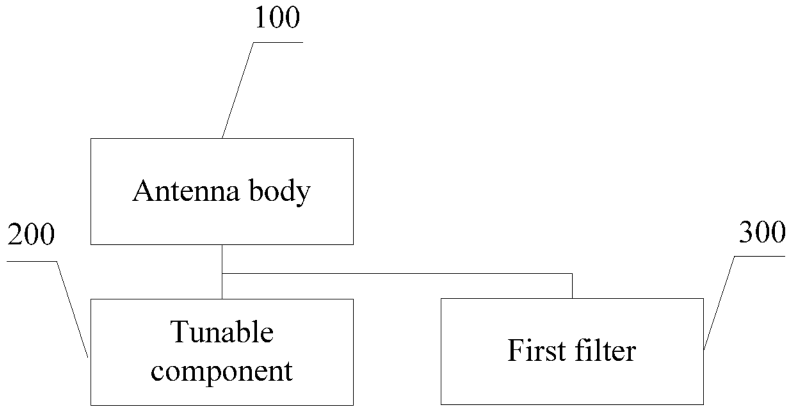
FIG. 1 is a structural diagram of an antenna system according to an embodiment of the present invention.
Figure 2:
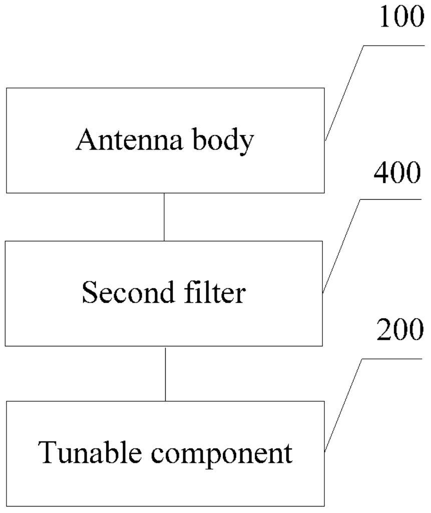
FIG. 2 is a structural diagram of an antenna system according to an embodiment of the present invention.
Figure 3:
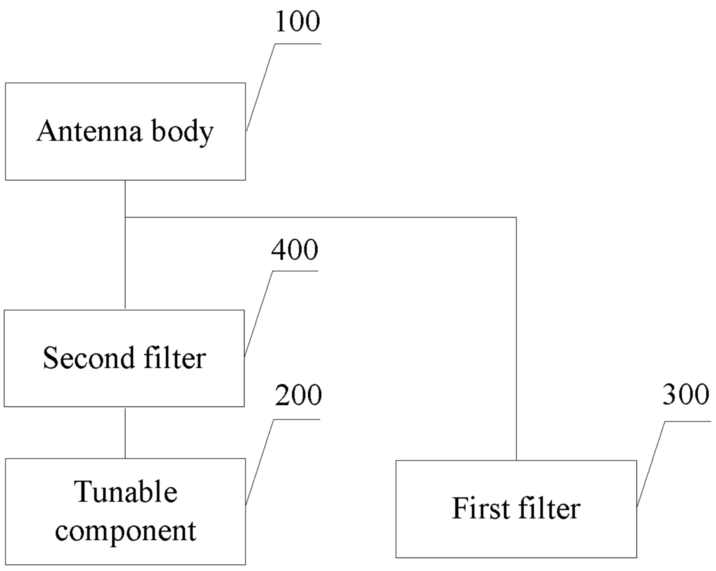
FIG. 3 is a structural diagram of an antenna system according to an embodiment of the present invention.

Embodiments of the present invention provide an antenna system. Referring to FIG. 1, FIG. 2, and FIG. 3, FIG. 1, FIG. 2, and FIG. 3 each show a schematic structural diagram of an antenna system. FIG. 1 shows a schematic structural diagram of an antenna system in which a first filter is connected in parallel to a tunable component; FIG. 2 shows a schematic structural diagram of an antenna system in which a second filter is connected in series between an antenna body and a tunable component; FIG. 3 shows a schematic structural diagram of an antenna system that includes a first filter, a second filter, a tunable component, and an antenna body.

The antenna system includes an antenna body, a tunable component, a first filter and/or a second filter. The antenna body is connected to the tunable component. The first filter is connected in parallel to the tunable component; the first filter presents a high impedance characteristic in a low frequency band, and presents a low impedance characteristic in a high frequency band. The second filter presents a low impedance characteristic in a low frequency band, presents a high impedance characteristic in a high frequency band, and is connected in series between the antenna body and the tunable component, where a first end of the second filter is connected to the antenna body, and a second end of the second filter is connected to the tunable component.

The low frequency band and the high frequency band in the foregoing indicate a difference in frequencies of two frequency bands in which the antenna system operates. High impedance means that during transmission in a radio frequency system, energy transmitted from a signal source is reflected due to impedance mismatch, and an objective of energy transmission cannot be achieved; conversely, low impedance means that energy can successfully pass.

Referring to FIG. 1, the antenna system may include an antenna body 100, a tunable component 200, and a first filter 300. The first filter 300 presents a high impedance characteristic in a low frequency band, presents a low impedance characteristic in a high frequency band, and is connected in parallel to the tunable component 200.

There is one or more connection points between the antenna body 100 and the ground, where the tunable component 200 is connected in series to one of the connection points, one end of the tunable component 200 is connected to the connection point, and another end is connected to the ground. The first filter 300 is connected in parallel to the tunable component 200, and in an implementation manner, the tunable component 200 and the first filter 300 are simultaneously connected to the connection point, so that the antenna body 100 has two parallel paths between the connection point and the ground, that is, a path passing the first filter 300 and a path passing the tunable component 200. In addition, when the first filter 300 is connected in parallel to the tunable component 200, a first end of the first filter 300 is connected to the antenna body 100, and a second end of the first filter 300 is connected to the ground; or a first end of the first filter 300 is connected to the tunable component 200, and a second end of the first filter 300 is connected to the ground.

Referring to FIG. 2, the antenna system may include an antenna body 100, a tunable component 200, and a second filter 400. The second filter 400 is connected in series between the antenna body 100 and the tunable component 200, where a first end of the second filter 400 is connected to the antenna body 100, and a second end of the second filter 400 is connected to the tunable component 200. The second filter 400 presents a low impedance characteristic in a low frequency band, and presents a high impedance characteristic in a high frequency band.

There are one or more connection points between the antenna body 100 and the ground, where the second filter 400 and the tunable component 200 are sequentially connected to one of the connection points. The second filter 400 and the tunable component 200 form a serial connection relationship, so that at the connection point, the antenna body 100 is connected to the ground by sequentially using the second filter 400 and the tunable component 200, that is, both the tunable component 200 and the second filter 300 are connected in series to the connection point, so that between the connection point and the ground, the antenna body 100 is connected in series to the second filter 400 and the tunable component 200.

Referring to FIG. 3, the antenna system may include an antenna body 100, a tunable component 200, a first filter 300, and a second filter 400. The first filter 300 presents a high impedance characteristic in a low frequency band, presents a low impedance characteristic in a high frequency band, and is connected in parallel to the tunable component 200. The second filter 400 presents a low impedance characteristic in a low frequency band, presents a high impedance characteristic in a high frequency band, and is connected in series between the antenna body 100 and the tunable component 200. A first end of the second filter 400 is connected to the antenna body 100, and a second end of the second filter 400 is connected to the tunable component 200. A first end of the first filter 300 is connected to the antenna body 100 and the second filter 400, and a second end of the first filter 300 is connected to the ground. Alternatively, a first end of the first filter 300 is connected to the antenna body 100, the second filter 400, and the tunable component, and a second end of the first filter 300 is connected to the ground.

There are one or more connection points between the antenna body 100 and the ground, where the tunable component 200 is sequentially connected to one of the connection points; the first filter 300 and the second filter 400 are simultaneously disposed between the connection point and the ground. The first filter 300 is connected in parallel to a bypass of the tunable component 200; the second filter 400 is connected in series between the antenna body 100 and the tunable component 200, so that at the connection point, the antenna body 100 may be connected to the ground by using the second filter 400 and the tunable component 200, or may be connected to the ground by using the first filter 300.

The antenna system provided in the embodiments of the present invention includes an antenna body, a tunable component, a first filter and/or a second filter.

The first filter presents a high impedance characteristic in a low frequency band, presents a low impedance characteristic in a high frequency band, and is connected in parallel to the tunable component. Therefore, when the antenna operates in a low frequency band, due to high impedance of the filter, a radio frequency current at a ground point can pass only through a tunable component branch. When the antenna operates in a high frequency band, which is equivalent to being directly connected to the ground point because the filter presents low impedance, the radio frequency current is connected to the ground point mainly through a filter branch. In this case, disturbance to a high frequency current is fairly small even if a status of the tunable component branch changes, thereby ensuring that a change of the tunable component affects only the low frequency band, and significantly weakening impact on the high frequency band.

Alternatively, the second filter may be disposed, where the second filter presents a low impedance characteristic in a low frequency band, presents a high impedance characteristic in a high frequency band, and is connected in series between the antenna body and the tunable component. Therefore, when the antenna operates in a low frequency band, a radio frequency current at a ground point is not affected by the filter and is directly connected to the tunable component. When the antenna operates in a high frequency band, the high impedance characteristic of the filter blocks connection of the radio frequency current to the tunable component. Because this path is equivalent to being in a disconnected state, a status change of the tunable component does not affect current flow between the antenna and the ground point, thereby ensuring that the change of the tunable component affects only the low frequency band and significantly weakening impact on the high frequency band.

Alternatively, both the first filter and the second filter may be disposed. The second filter presents a low impedance characteristic in a low frequency band, presents a high impedance characteristic in a high frequency band, and is connected in series between the antenna body and the tunable component. The first filter presents a high impedance characteristic in a low frequency band, presents a low impedance characteristic in a high frequency band, and is connected in parallel to the tunable component. Therefore, when the antenna operates in a low frequency band, due to high impedance blocking by the first filter, a radio frequency current at a ground point can pass only through a series path that includes the second filter and the tunable component. Because the second filter presents low impedance at a low frequency, the radio frequency current is not affected by the second filter and is directly connected to the tunable component. When the antenna operates in a high frequency band, which is equivalent to being directly connected to the ground point because the first filter presents low impedance, the radio frequency current is connected to the ground point mainly through a first filter branch. In addition, the second filter presents high impedance that blocks connection of the radio frequency current to the tunable component, which further ensures that the radio frequency current is connected to the ground point only through the first filter branch. In this case, disturbance to a high frequency current is fairly small even if a status of a tunable component branch changes, thereby ensuring that a change of the tunable component affects only the low frequency band and significantly weakening impact on the high frequency band.

In an antenna broadband tunable technology of LTE-4G, each state of a tunable component corresponds to a frequency band of an antenna. When the antenna operates in a particular frequency band, performance at another frequency may be ignored. That is, if the antenna currently operates in a low frequency band, performance of the antenna in a high frequency band may be ignored because an entire terminal operates only in the low frequency band. However, after a carrier aggregation technology emerges in LTE-4G, a terminal system can simultaneously operate in two frequency bands, such as a low frequency band and a high frequency band. Because the terminal system needs to enhance bandwidth of a wireless network by increasing a spectrum width, an antenna needs to simultaneously maintain good performance in two specified frequency bands, that is, a specified low frequency band and a specified high frequency band. However, it is a relatively difficult project for an antenna in a current antenna system to maintain good performance in both a low frequency range and a high frequency band by using a status of only one tunable component. In the present invention, the project becomes less difficult. In the antenna system, a first filter or a second filter or both are disposed, and characteristics of the first filter and the second filter are set. It can be learned from above that, disposing of the first filter and/or the second filter can achieve an objective that high frequency impedance basically remains in a same state during low frequency tuning, and resolve a problem that the high frequency impedance is affected and thus disorderly changes when the antenna system tunes low frequency bandwidth.

In the foregoing embodiments of the present invention, the first filter is a single capacitor or an LC network that includes an inductor and a capacitor; the second filter is a single inductor or an LC network that includes an inductor and a capacitor.

Figure 4:
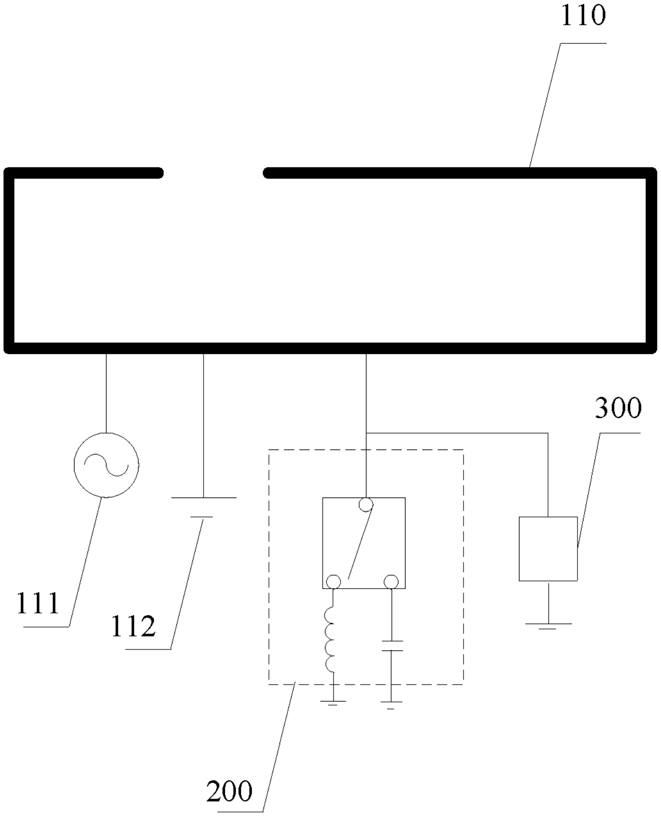
FIG. 4 is a structural diagram of an antenna system according to an embodiment of the present invention.

An embodiment of the present invention provides an antenna system. Referring to FIG. 4, FIG. 4 shows a schematic structural diagram of the antenna system, where the antenna system includes an IFA antenna body 110, a tunable component 200, and a first filter 300.

The first filter 300 presents a high impedance characteristic in a low frequency band, presents a low impedance characteristic in a high frequency band, and is connected in parallel to a bypass of the tunable component 200.

The IFA (inverted F antenna) is a type of an electronically small antenna. The IFA has an excitation point 111 for connecting to a signal, and further has one or more ground points 112, where the ground point is used for impedance tuning of the antenna, and facilitates impedance matching with a radio frequency feeder on a board.

There are one or more connection points between the IFA antenna body 110 and the ground, where the tunable component 200 is connected in series to one of the connection points. The first filter 300 is connected in parallel to the bypass of the tunable component 200, and forms a parallel connection relationship with the tunable component 200. That is, the tunable component 200 and the first filter 300 are simultaneously connected to the connection point, so that the IFA antenna body 110 has two parallel paths between the connection point and the ground, that is, a path passing the first filter 300 and a path passing the tunable component 200.

Figure 5:
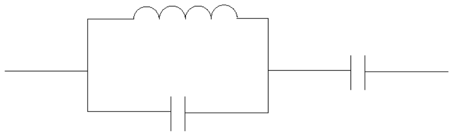
FIG. 5 is a structural diagram of a first filter and a second filter according to an embodiment of the present invention.
Figure 6:
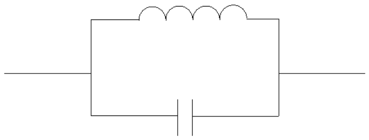
FIG. 6 is a structural diagram of a first filter and a second filter according to an embodiment of the present invention.
Figure 7:
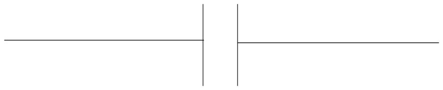
FIG. 7 is a structural diagram of a first filter according to an embodiment of the present invention.

As shown in FIG. 5, FIG. 6, and FIG. 7, the first filter 300 may be a single capacitor, or the first filter 300 may be an LC network that includes an inductor and a capacitor, where L represents the inductor, and C represents the capacitor. The LC network indicates a filter circuit network established by using an inductor and a capacitor. FIG. 5 shows a schematic structural diagram of an LC network that includes an inductor and a capacitor; FIG. 6 shows another schematic structural diagram of an LC network that includes an inductor and a capacitor; FIG. 7 shows a schematic diagram of the first filter 300 being a single capacitor.

Further, the foregoing tunable component 200 includes a switch and/or a tunable capacitor and/or a Pin diode.

Figure 9:
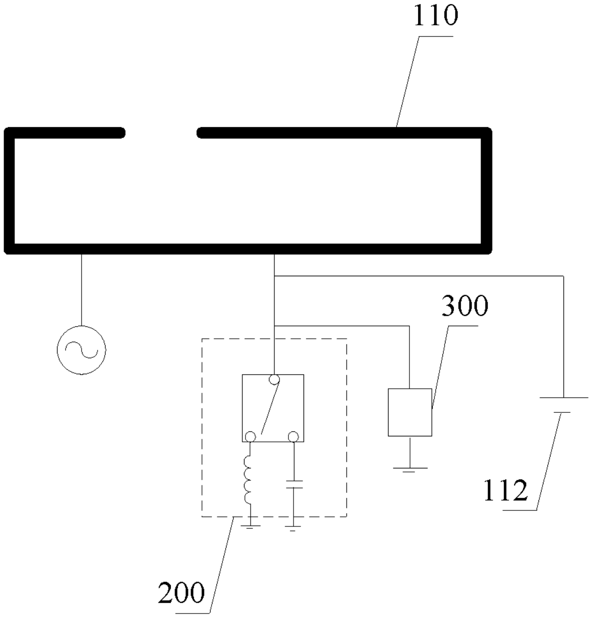
FIG. 9 is a structural diagram of an antenna system according to an embodiment of the present invention.

In addition, referring to FIG. 9, the antenna system includes the IFA antenna body 110, the tunable component 200, and the first filter 300. The ground point 112 of the IFA is connected in parallel to the bypass of the tunable component 200. A position of the ground point 112 of the IFA antenna may be used for impedance tuning, that is, for adjusting a resonance frequency of the antenna.

The first filter 300 presents a high impedance characteristic in a low frequency band, presents a low impedance characteristic in a high frequency band, and is connected in parallel to the tunable component. Therefore, when the antenna operates in a low frequency band, due to high impedance blocking by the filter, a radio frequency current at the ground point can pass only through a tunable component branch. When the antenna operates in a high frequency band, which is equivalent to being directly connected to the ground point because the filter presents low impedance, the radio frequency current is connected to the ground point mainly through a filter branch. In this case, disturbance to a high frequency current is fairly small even if a status of the tunable component branch changes, thereby ensuring that a change of the tunable component affects only the low frequency band, and significantly weakening impact on the high frequency band.

Figure 10:
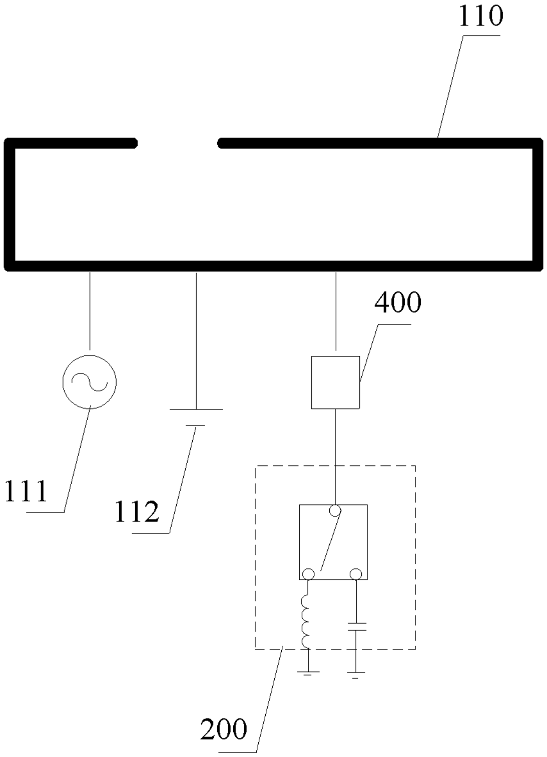
FIG. 10 is a structural diagram of an antenna system according to an embodiment of the present invention.

An embodiment of the present invention provides an antenna system. Referring to FIG. 10, FIG. 10 shows a schematic structural diagram of the antenna system, where the antenna system includes an IFA antenna body 110, a tunable component 200, and a second filter 400.

The second filter 400 presents low impedance in a low frequency band, presents high impedance in a high frequency band, and is connected in series between the IFA antenna body no and the tunable component 200.

The IFA (inverted F antenna) is a type of an electronically small antenna. The IFA has an excitation point 111 for connecting to a signal, and further has one or more ground points 112, where the ground point 112 is used for impedance tuning of the antenna, and facilitates impedance matching with a radio frequency feeder on a board.

There is one or more connection points between the IFA antenna body 110 and the ground, where the tunable component 200 is connected in series to one of the connection points. The second filter 400 is connected in series between the IFA antenna body 110 and the tunable component 200, and forms a serial connection relationship with the tunable component 200, so that at the connection point, the IFA antenna body 110 is connected to the ground by sequentially passing the second filter 400 and the tunable component 200, that is, both the tunable component 200 and the second filter 400 are connected in series to the connection point, so that between the connection point and the ground, the IFA antenna body 110 is connected in series to the second filter 400 and the tunable component 200.

The tunable component 200 includes a switch and/or a tunable capacitor and/or a Pin diode.

Figure 8:
FIG. 8 is a structural diagram of a second filter according to an embodiment of the present invention.

As shown in FIG. 5, FIG. 6, and FIG. 8, the second filter 400 may include a single capacitor, or the second filter 400 may include an LC network that includes an inductor and a capacitor, where L represents the inductor, and C represents the capacitor. The LC network indicates a filter circuit network established by using an inductor and a capacitor. FIG. 5 shows a schematic structural diagram of an LC network that includes an inductor and a capacitor; FIG. 6 shows another schematic structural diagram of an LC network that includes an inductor and a capacitor; FIG. 8 shows a schematic diagram of the second filter 400 being a single inductor.

Figure 11:
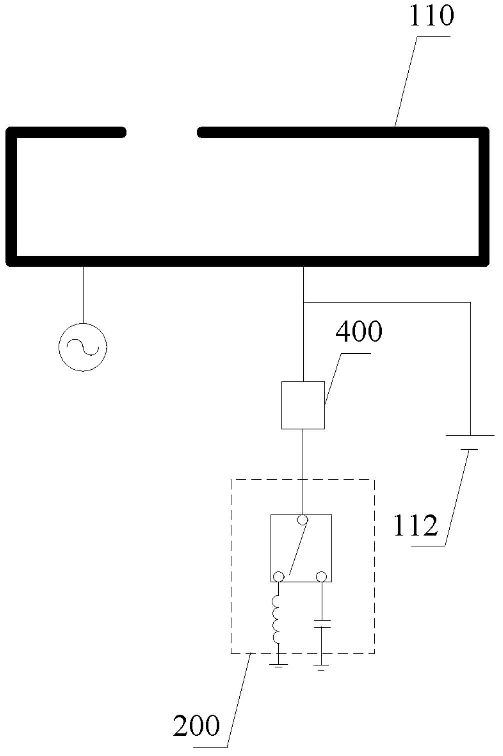
FIG. 11 is a structural diagram of an antenna system according to an embodiment of the present invention.

In addition, referring to FIG. 11, the antenna system includes the IFA antenna body 110, the tunable component 200, and the second filter 400. Different from the foregoing embodiment, the ground point 112 of the IFA is connected in parallel to a bypass of the tunable component 200.

The second filter 400 presents a low impedance characteristic in a low frequency band, presents a high impedance characteristic in a high frequency band, and is connected in series between the antenna body and the tunable component. Therefore, when the antenna operates in a low frequency band, a radio frequency current at the ground point is not affected by the filter and is directly connected to the tunable component. When the antenna operates in a high frequency band, the high impedance characteristic of the filter blocks connection of the radio frequency current to the tunable component. Because this path is equivalent to being in a disconnected state, a change of the tunable component in status does not affect current flow between the antenna and the ground point, thereby ensuring that the change of the tunable component affects only the low frequency band and significantly weakening impact on the high frequency band.

Figure 12:
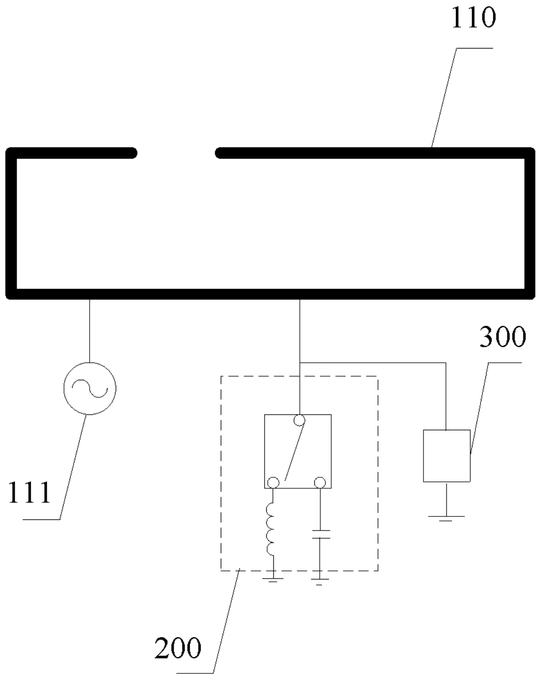
FIG. 12 is a structural diagram of an antenna system according to an embodiment of the present invention.

An embodiment of the present invention provides an antenna system. Referring to FIG. 12, FIG. 12 shows a schematic structural diagram of the antenna system, where the antenna system includes an IFA antenna body 110, a tunable component 200, and a first filter 300.

The first filter 300 presents a high impedance characteristic in a low frequency band, presents a low impedance characteristic in a high frequency band, and is connected in parallel to the tunable component 200.

In comparison with the IFAs in FIG. 4 and FIG. 9, a major difference lies in that the IFA antenna body 110 in this embodiment has no ground point 112.

The tunable component 200 includes a switch and/or a tunable capacitor and/or a Pin diode.

As shown in FIG. 5, FIG. 6, and FIG. 7, the first filter 300 may include a single capacitor, or the first filter 300 may include an LC network that includes an inductor and a capacitor.

The first filter 300 presents high impedance in a low frequency band, presents low impedance in a high frequency band, and is connected in parallel to a bypass of the tunable component. Therefore, when the antenna operates in a low frequency band, due to high impedance blocking by the filter, a radio frequency current at a ground point can pass only through a tunable component branch. When the antenna operates in a high frequency band, which is equivalent to being directly connected to the ground point because the filter presents low impedance, the radio frequency current is connected to the ground point mainly through a filter branch. In this case, disturbance to a high frequency current is fairly small even if a status of the tunable component branch changes, thereby ensuring that a change of the tunable component affects only the low frequency band and significantly weakening impact on the high frequency band.

Figure 13:
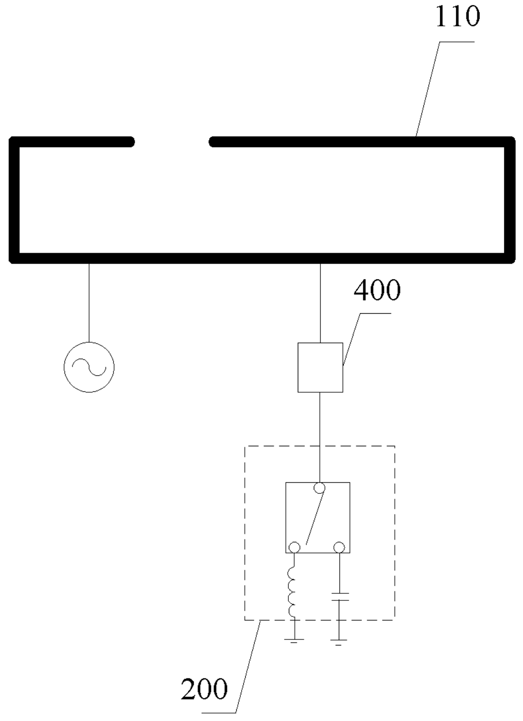
FIG. 13 is a structural diagram of an antenna system according to an embodiment of the present invention.

An embodiment of the present invention provides an antenna system. Referring to FIG. 13, FIG. 13 shows a schematic structural diagram of the antenna system, where the antenna system includes an IFA antenna body 110, a tunable component 200, and a second filter 400.

The second filter 400 presents low impedance in a low frequency band, presents high impedance in a high frequency band, and is connected in series between the IFA antenna body 110 and the tunable component 200. A first end of the second filter 400 is connected to the antenna body 100, and a second end of the second filter 400 is connected to the tunable component 200.

In comparison with the IFAs in FIG. 10 and FIG. 11, the IFA antenna body 110 in this embodiment has no ground point 112.

The tunable component 200 includes a switch and/or a tunable capacitor and/or a Pin diode.

As shown in FIG. 5, FIG. 6, and FIG. 8, the second filter 400 may include a single inductor, or the second filter 400 may include an LC network that includes an inductor and a capacitor.

The second filter 400 presents low impedance in a low frequency band, presents high impedance in a high frequency band, and is connected in series between the antenna body and the tunable component. Therefore, when the antenna operates in a low frequency band, a radio frequency current at a ground point is not affected by the filter and is directly connected to the tunable component. When the antenna operates in a high frequency band, a high impedance characteristic of the filter blocks connection of the radio frequency current to the tunable component. Because this path is equivalent to being in a disconnected state, a change of the tunable component in status does not affect current flow between the antenna and the ground point, thereby ensuring that the change of the tunable component affects only the low frequency band and significantly weakening impact on the high frequency band.

Figure 14:
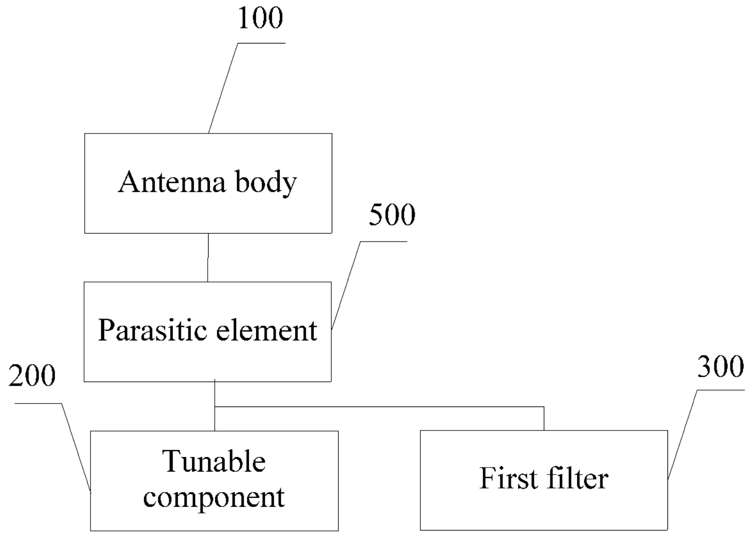
FIG. 14 is a structural diagram of an antenna system according to an embodiment of the present invention.

An embodiment of the present invention provides an antenna system. Referring to FIG. 14, FIG. 14 shows a schematic structural diagram of the antenna system. The antenna system includes: an antenna body 100, a tunable component 200, a first filter 300, and a parasitic element 500.

The first filter 300 is connected in parallel to the tunable component 200; the first filter 300 presents a high impedance characteristic in a low frequency band, and presents a low impedance characteristic in a high frequency band.

The tunable component 200 is connected to the antenna body 100 by using the parasitic element 500.

A first end of the first filter 300 is connected to the antenna body 100 by using the parasitic element 500.

Different from the foregoing embodiments, the parasitic element 500 is disposed in this embodiment of the present invention. There is no physical connection between the parasitic element 500 and the antenna body 100, but there is a coupling function of a magnetic field, so that an operating characteristic in some frequency bands that is of a major branch of the antenna body may be changed by adjusting a structure of the parasitic element. If the tunable component is connected to the parasitic element, a coupling quantity of the parasitic element and the major branch can be changed without changing the structure of the parasitic element, so as to change an operating characteristic of the antenna. Further, the parasitic element may increase operating bandwidth of the antenna, and form capacitive load for particular impedance resonance, so as to reduce an operating frequency channel number.

The antenna system provided in this embodiment of the present invention includes an antenna body, a tunable component, a parasitic element, and a first filter.

The first filter presents high impedance in a low frequency band, presents low impedance in a high frequency band, and is connected in parallel to the tunable component. Therefore, when the antenna operates in a low frequency band, due to high impedance blocking by the filter, a radio frequency current at a ground point can pass only through a tunable component branch. When the antenna operates in a high frequency band, which is equivalent to being directly connected to the ground point because the filter presents low impedance, the radio frequency current is connected to the ground point mainly through a filter branch. In this case, disturbance to a high frequency current is fairly small even if a status of the tunable component branch changes, thereby ensuring that a change of the tunable component affects only the low frequency band and significantly weakening impact on the high frequency band.

Therefore, disposing of the foregoing first filter can achieve an objective that high frequency impedance basically remains in a same state during low frequency tuning, and resolve a problem that the high frequency impedance is affected and thus disorderly changes when the antenna system tunes low frequency bandwidth.

Further, disposing of the parasitic element on the antenna body may increase operating bandwidth of the antenna, and may further form capacitive load for particular impedance resonance, so as to provide a function of reducing an operating frequency channel number. Therefore, by disposing the first filter on the parasitic element, low frequency resonance can be tuned without affecting a broadband resonance characteristic at a high frequency.

Figure 15:
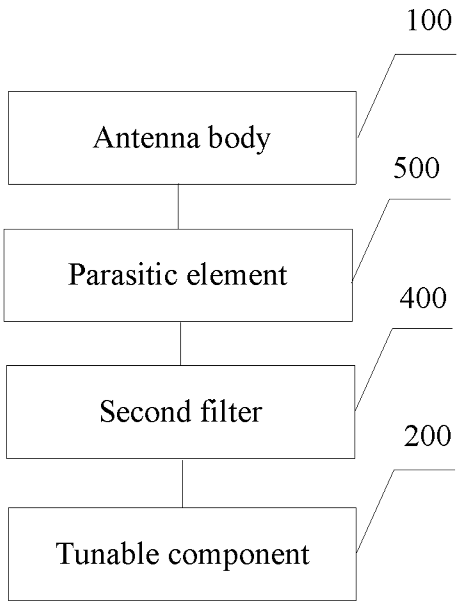
FIG. 15 is a structural diagram of an antenna system according to an embodiment of the present invention.

An embodiment of the present invention provides an antenna system. Referring to FIG. 15, FIG. 15 shows a schematic structural diagram of the antenna system. The antenna system includes: an antenna body 100, a tunable component 200, a second filter 400, and a parasitic element 500.

The second filter 400 presents a low impedance characteristic in a low frequency band, and presents a high impedance characteristic in a high frequency band; a first end of the second filter 400 is connected to the antenna body 100 by using the parasitic element 500, and a second end of the second filter 400 is connected to the tunable component 200.

The tunable component 200 is connected to the antenna body 100 by sequentially using the second filter 400 and the parasitic element 500.

Different from the foregoing embodiments, the parasitic element 500 is disposed in this embodiment of the present invention. There is no physical connection between the parasitic element 500 and the antenna body 100, but there is a coupling function of a magnetic field, so that an operating characteristic in some frequency bands that is of a major branch of the antenna body may be changed by adjusting a structure of the parasitic element. If the tunable component is connected to the parasitic element, a coupling quantity of the parasitic element and the major branch can be changed without changing the structure of the parasitic element, so as to change an operating characteristic of the antenna. Further, the parasitic element may increase operating bandwidth of the antenna, and form capacitive load for particular impedance resonance, so as to reduce an operating frequency channel number.

The second filter 400 presents low impedance in a low frequency band, presents high impedance in a high frequency band, and is connected in series between the antenna body and the tunable component. Therefore, when the antenna operates in a low frequency band, a radio frequency current at a ground point is not affected by the filter and is directly connected to the tunable component. When the antenna operates in a high frequency band, a high impedance characteristic of the filter blocks connection of the radio frequency current to the tunable component. Because this path is equivalent to being in a disconnected state, a change of the tunable component in status does not affect current flow between the antenna and the ground point, thereby ensuring that the change of the tunable component affects only the low frequency band and significantly weakening impact on the high frequency band.

Further, disposing of the parasitic element on the antenna body may increase operating bandwidth of the antenna, and may further form capacitive load for particular impedance resonance, so as to provide a function of reducing an operating frequency channel number. Therefore, by disposing the first filter on the parasitic element, low frequency resonance can be tuned without affecting a broadband resonance characteristic at a high frequency.

Figure 16:
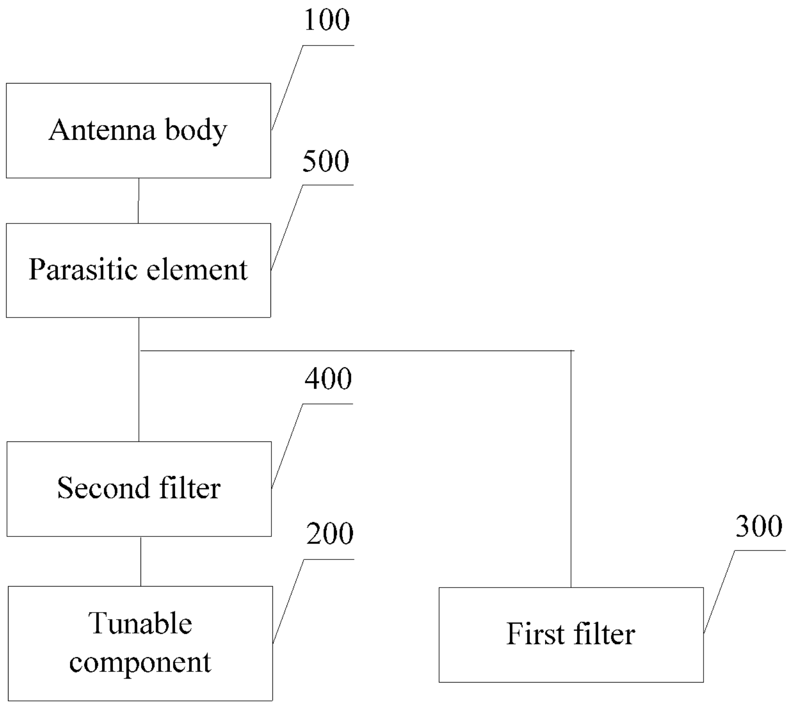
FIG. 16 is a structural diagram of an antenna system according to an embodiment of the present invention.

An embodiment of the present invention provides an antenna system. Referring to FIG. 16, FIG. 16 shows a schematic structural diagram of the antenna system. The antenna system includes an antenna body 100, a tunable component 200, a first filter 300, a second filter 400, and a parasitic element 500.

The first filter 300 presents a high impedance characteristic in a low frequency band, and presents a low impedance characteristic in a high frequency band. A first end of the first filter 300 is connected to the antenna body 100 by using the parasitic element 500, and the first filter 300 is connected in parallel to the tunable component.

The second filter 400 presents a low impedance characteristic in a low frequency band, presents a high impedance characteristic in a high frequency band, and is connected in series between the parasitic element 500 on a wire of the antenna body and the tunable component 200. A first end of the second filter 400 is connected to the antenna body 100 by using the parasitic element 500, and a second end of the second filter 400 is connected to the tunable component 200. The tunable component 200 is connected to the antenna body 100 by sequentially using the second filter 400 and the parasitic element 500.

Different from the foregoing embodiments, the parasitic element 500 is disposed in this embodiment of the present invention. There is no physical connection between the parasitic element 500 and the antenna body 100, but there is a coupling function of a magnetic field, so that an operating characteristic in some frequency bands that is of a major branch of the antenna body may be changed by adjusting a structure of the parasitic element. If the tunable component is connected to the parasitic element, a coupling quantity of the parasitic element and the major branch can be changed without changing the structure of the parasitic element, so as to change an operating characteristic of the antenna. Further, the parasitic element may increase operating bandwidth of the antenna, and form capacitive load for particular impedance resonance, so as to reduce an operating frequency channel number.

The second filter presents a low impedance characteristic in a low frequency band, presents a high impedance characteristic in a high frequency band, and is connected in series between the antenna body and the tunable component. The first filter presents high impedance in a low frequency band, presents low impedance in a high frequency band, and is connected in parallel to a bypass of a path connecting in series the second filter and the tunable component. Therefore, when the antenna operates in a low frequency band, due to high impedance blocking by the first filter, a radio frequency current at a ground point can pass only through the series path that includes the second filter and the tunable component. Because the second filter presents low impedance at a low frequency, the radio frequency current is not affected by the second filter and is directly connected to the tunable component. When the antenna operates in a high frequency band, which is equivalent to being directly connected to the ground point because the first filter presents low impedance, the radio frequency current is connected to the ground point mainly through a first filter branch. In addition, the second filter presents high impedance that blocks connection of the radio frequency current to the tunable component, which further ensures that the radio frequency current is connected to the ground point only through the first filter branch. In this case, disturbance to a high frequency current is fairly small even if a status of a tunable component branch changes, thereby ensuring that a change of the tunable component affects only the low frequency band and significantly weakening impact on the high frequency band.

Further, disposing of the parasitic element on the antenna body may increase operating bandwidth of the antenna, and may further form capacitive load for particular impedance resonance, so as to provide a function of reducing an operating frequency channel number. Therefore, by disposing the first filter on the parasitic element, low frequency resonance can be tuned without affecting a broadband resonance characteristic at a high frequency.

Figure 17:
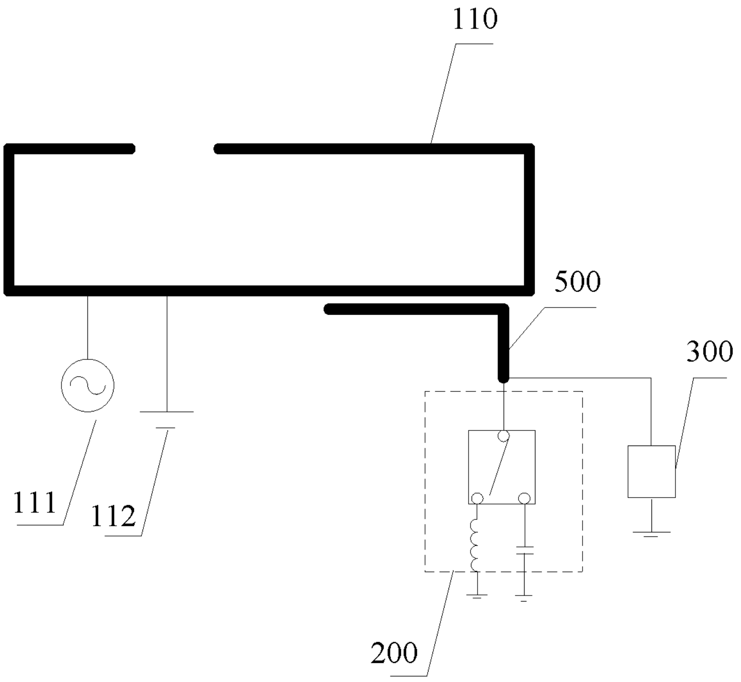
FIG. 17 is a structural diagram of an antenna system according to an embodiment of the present invention.

An embodiment of the present invention provides an antenna system. Referring to FIG. 17, FIG. 17 shows a schematic structural diagram of the antenna system, where the antenna system includes an IFA antenna body 110, a tunable component 200, a parasitic element 500, and a first filter 300.

The first filter 300 presents a high impedance characteristic in a low frequency band, presents a low impedance characteristic in a high frequency band, and is connected in parallel to the tunable component 200.

The tunable component 200 is connected to the IFA antenna body 110 by using the parasitic element 500.

A first end of the first filter 300 is connected to the IFA antenna body 110 by using the parasitic element 500, and a second end of the first filter 300 is connected to the ground.

The IFA (inverted F antenna) is a type of an electronically small antenna. The IFA has an excitation point in for connecting to a signal, and further has one or more ground points 112, where the ground point is used for impedance tuning of the antenna, and facilitates impedance matching with a radio frequency feeder on a board.

The first filter 300 may include a single capacitor, or the first filter 300 may include an LC network that includes an inductor and a capacitor, where L represents the inductor, and C represents the capacitor. The LC network indicates a filter circuit network established by using an inductor and a capacitor. FIG. 5 shows a schematic structural diagram of an LC network that includes an inductor and a capacitor; FIG. 6 shows another schematic structural diagram of an LC network that includes an inductor and a capacitor; FIG. 7 shows a schematic diagram of the first filter 300 being a single capacitor.

The tunable component 200 includes a switch and/or a tunable capacitor and/or a Pin diode.

The first filter 300 presents a high impedance characteristic in a low frequency band, and presents a low impedance characteristic in a high frequency band, and the first filter 300 and the tunable component are connected in parallel to the parasitic element 500. Therefore, when the antenna operates in a low frequency band, due to high impedance blocking by the filter, a radio frequency current on the parasitic element can pass only through a tunable component branch. When the antenna operates in a high frequency band, which is equivalent to being directly connected to the ground point because the filter presents low impedance, the radio frequency current is connected to the ground point mainly through a filter branch. In this case, disturbance to a high frequency current is fairly small even if a status of the tunable component branch changes, thereby ensuring that a change of the tunable component affects only the low frequency band and significantly weakening impact on the high frequency band.

Figure 18:
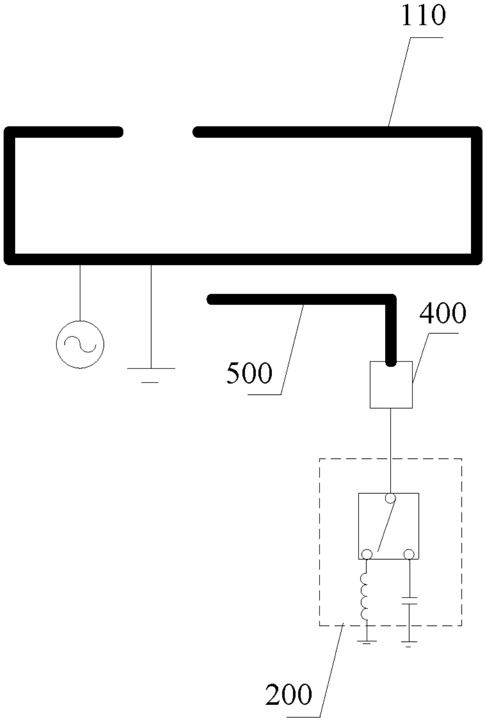
FIG. 18 is a structural diagram of an antenna system according to an embodiment of the present invention.

An embodiment of the present invention provides an antenna system. Referring to FIG. 18, FIG. 18 shows a schematic structural diagram of the antenna system, where the antenna system includes an IFA antenna body 110, a tunable component 200, a parasitic element 500, and a second filter 400.

The second filter 400 presents a low impedance characteristic in a low frequency band, and presents a high impedance characteristic in a high frequency band; a first end of the second filter 400 is connected to the IFA antenna body 110 by using the parasitic element 500, and a second end of the second filter 400 is connected to the tunable component 200; the second filter 400 is connected in series between the parasitic element 500 and the tunable component 200.

The tunable component 200 includes a switch and/or a tunable capacitor and/or a Pin diode.

The second filter 400 may include a single inductor, or the second filter 400 may include an LC network that includes an inductor and a capacitor.

The second filter 400 presents a low impedance characteristic in a low frequency band, presents a high impedance characteristic in a high frequency band, and is connected in series between the parasitic element and the tunable component. Therefore, when the antenna operates in a low frequency band, a radio frequency current on the parasitic element is not affected by the filter and is directly connected to the tunable component. When the antenna operates in a high frequency band, the high impedance characteristic of the filter blocks connection of the radio frequency current to the tunable component. Because this path is equivalent to being in a disconnected state, a change of the tunable component in status does not affect current flow on the parasitic element of the antenna, thereby ensuring that the change of the tunable component affects only the low frequency band and significantly weakening impact on the high frequency band.

Figure 19:
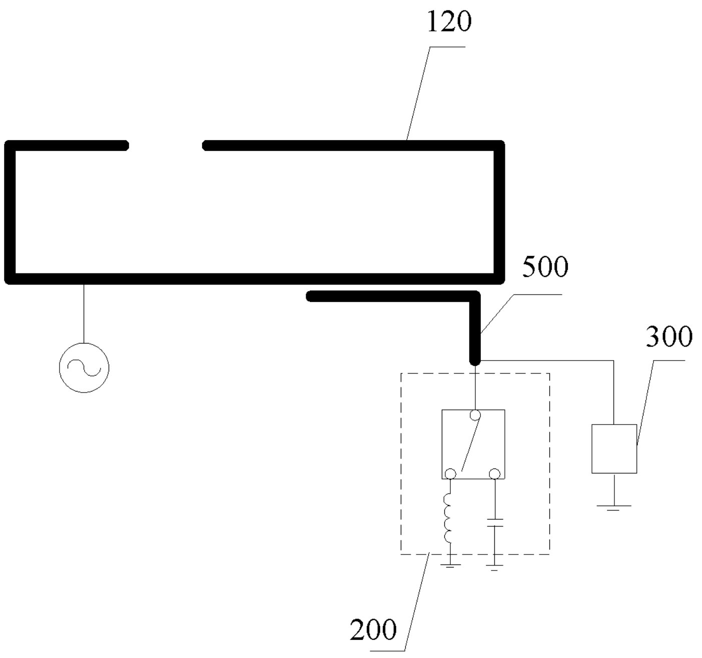
FIG. 19 is a structural diagram of an antenna system according to an embodiment of the present invention.

An embodiment of the present invention provides an antenna system. Referring to FIG. 19, FIG. 19 shows a schematic structural diagram of the antenna system, where the antenna system includes a monopole antenna body 120, a tunable component 200, a parasitic element 500, and a first filter 300.

The monopole antenna is also referred to as a monopole antenna, and is a type of an electronically small antenna. In comparison with an IFA antenna, a major difference lies in that the monopole antenna has no ground point 112 of the IFA antenna, has no ground point that is connected to the ground by using the tunable component, and has no ground point that is connected to the ground by using the first filter and the second filter.

The first filter 300 is connected in parallel to the tunable component 200; the first filter 300 presents a high impedance characteristic in a low frequency band, and presents a low impedance characteristic in a high frequency band.

The tunable component 200 is connected to the monopole antenna body 120 by using the parasitic element 500.

A first end of the first filter 300 is connected to the monopole antenna body 120 by using the parasitic element 500.

The first filter 300 may include a single inductor, or the first filter 300 may include an LC network that includes an inductor and a capacitor.

The tunable component 200 includes a switch and/or a tunable capacitor and/or a Pin diode.

The first filter 300 presents a high impedance characteristic in a low frequency band, presents a low impedance characteristic in a high frequency band, and is connected in parallel to the tunable component. Therefore, when the antenna operates in a low frequency band, due to high impedance blocking by the filter, a radio frequency current at a ground point can pass only through a tunable component branch. When the antenna operates in a high frequency band, which is equivalent to being directly connected to the ground point because the filter presents low impedance, the radio frequency current is connected to the ground point mainly through a filter branch. In this case, disturbance to a high frequency current is fairly small even if a status of the tunable component branch changes, thereby ensuring that a change of the tunable component affects only the low frequency band and significantly weakening impact on the high frequency band.

Further, disposing of the parasitic element on the monopole antenna body 120 may increase operating bandwidth of the antenna, and may further form capacitive load for particular impedance resonance, so as to provide a function of reducing an operating frequency channel number. Therefore, by disposing the first filter on the parasitic element, low frequency resonance can be tuned without affecting a broadband resonance characteristic at a high frequency.

Figure 20:
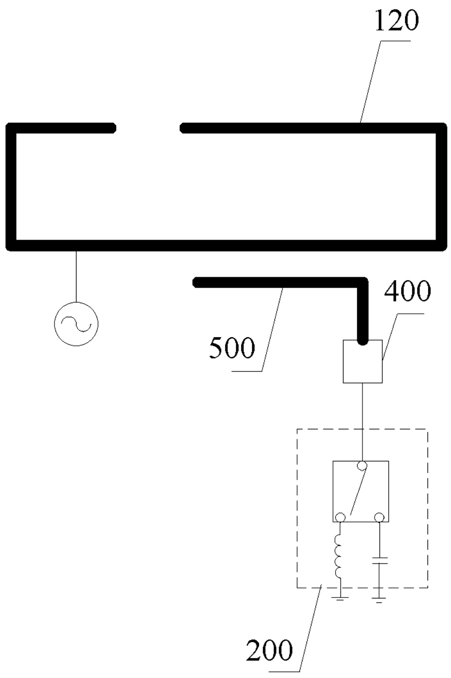
FIG. 20 is a structural diagram of an antenna system according to an embodiment of the present invention.

An embodiment of the present invention provides an antenna system. Referring to FIG. 20, FIG. 20 shows a schematic structural diagram of the antenna system, where the antenna system includes a monopole antenna body 120, a tunable component 200, a parasitic element 500, and a second filter 400.

The second filter 400 presents a low impedance characteristic in a low frequency band, and presents a high impedance characteristic in a high frequency band; a first end of the second filter 400 is connected to the monopole antenna body 120 by using the parasitic element 500, and a second end of the second filter 400 is connected to the tunable component 200.

The tunable component 200 is connected to the monopole antenna body 120 by sequentially using the second filter 400 and the parasitic element 500.

The tunable component 200 includes a switch or a tunable capacitor or a Pin diode.

The second filter 400 may include a single inductor, or a first filter 300 may include an LC network that includes an inductor and a capacitor.

The second filter 400 presents low impedance in a low frequency band, presents high impedance in a high frequency band, and is connected in series between the antenna body and the tunable component. Therefore, when the antenna operates in a low frequency band, a radio frequency current at a ground point is not affected by the filter and is directly connected to the tunable component. When the antenna operates in a high frequency band, a high impedance characteristic of the filter blocks connection of the radio frequency current to the tunable component. Because this path is equivalent to being in a disconnected state, a change of the tunable component in status does not affect current flow between the antenna and the ground point, thereby ensuring that the change of the tunable component affects only the low frequency band and significantly weakening impact on the high frequency band.

Further, disposing of the parasitic element on the monopole antenna body 120 may increase operating bandwidth of the antenna, and may further form capacitive load for particular impedance resonance, so as to provide a function of reducing an operating frequency channel number. Therefore, by disposing the first filter on the parasitic element, low frequency resonance can be tuned without affecting a broadband resonance characteristic at a high frequency.

It should be added that the antenna body in the foregoing embodiments is not limited to the IFA antenna or the monopole antenna, and may be an antenna of another form, which is not limited herein.

Figure 21:
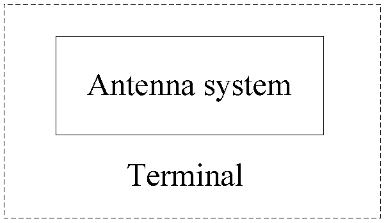
FIG. 21 is a schematic structural diagram of a terminal according to an embodiment of the present invention.

Referring to FIG. 21, an embodiment of the present invention further provides a terminal, which includes an antenna system, where the antenna system includes an antenna body, a tunable component, a first filter and/or a second filter.

The antenna body is connected to the tunable component.

The first filter is connected in parallel to the tunable component, and the first filter presents a high impedance characteristic in a low frequency band, and presents a low impedance characteristic in a high frequency band.

The second filter is connected in series between the antenna body and the tunable component, where a first end of the second filter is connected to the antenna body, and a second end of the second filter is connected to the tunable component. The second filter presents a low impedance characteristic in a low frequency band, and presents a high impedance characteristic in a high frequency band.

The first filter presents a high impedance characteristic in a low frequency band, presents a low impedance characteristic in a high frequency band, and is connected in parallel to the tunable component. Therefore, when the antenna operates in a low frequency band, due to high impedance blocking by the filter, a radio frequency current at a ground point can pass only through a tunable component branch. When the antenna operates in a high frequency band, which is equivalent to being directly connected to the ground point because the filter presents low impedance, the radio frequency current is connected to the ground point mainly through a filter branch. In this case, disturbance to a high frequency current is fairly small even if a status of the tunable component branch changes, thereby ensuring that a change of the tunable component affects only the low frequency band and significantly weakening impact on the high frequency band.

Alternatively, the second filter may be disposed, where the second filter presents a low impedance characteristic in a low frequency band, presents a high impedance characteristic in a high frequency band, and is connected in series between the antenna body and the tunable component. Therefore, when the antenna operates in a low frequency band, a radio frequency current at a ground point is not affected by the filter and is directly connected to the tunable component. When the antenna operates in a high frequency band, the high impedance characteristic of the filter blocks connection of the radio frequency current to the tunable component. Because this path is equivalent to being in a disconnected state, a change of the tunable component in status does not affect current flow between the antenna and the ground point, thereby ensuring that the change of the tunable component affects only the low frequency band and significantly weakening impact on the high frequency band.

Alternatively, both the first filter and the second filter may be disposed. The second filter presents a low impedance characteristic in a low frequency band, presents a high impedance characteristic in a high frequency band, and is connected in series between the antenna body and the tunable component. The first filter presents a high impedance characteristic in a low frequency band, presents a low impedance characteristic in a high frequency band, and is connected in parallel to the tunable component. Therefore, when the antenna operates in a low frequency band, due to high impedance blocking by the first filter, a radio frequency current at a ground point can pass only through a series path that includes the second filter and the tunable component. Because the second filter presents low impedance at a low frequency, the radio frequency current is not affected by the second filter and is directly connected to the tunable component. When the antenna operates in a high frequency band, which is equivalent to being directly connected to the ground point because the first filter presents low impedance, the radio frequency current is connected to the ground point mainly through a first filter branch. In addition, the second filter presents high impedance that blocks connection of the radio frequency current to the tunable component, which further ensures that the radio frequency current is connected to the ground point only through the first filter branch. In this case, disturbance to a high frequency current is fairly small even if a status of a tunable component branch changes, thereby ensuring that a change of the tunable component affects only the low frequency band and significantly weakening impact on the high frequency band.

In an antenna broadband tunable technology of LTE-4G, each state of a tunable component correspondingly covers a frequency band of an antenna. When the antenna operates in a particular frequency band, performance at another frequency may be ignored; that is, if the antenna currently operates in a low frequency band, performance of the antenna in a high frequency band may be ignored because an entire terminal operates only in the low frequency band. However, after a carrier aggregation technology emerges in LTE-4G, a terminal system can simultaneously operate in two frequency bands, such as a low frequency band and a high frequency band. Because the terminal system needs to enhance bandwidth of a wireless network by increasing a spectrum width, an antenna needs to simultaneously maintain good performance in two specified frequency bands, that is, a specified low frequency band and a specified high frequency band. However, it is a relatively difficult project for an antenna in a current antenna system to maintain good performance in both a low frequency range and a high frequency band by using a status of only one tunable component. In the present invention, the project becomes less difficult. In the antenna system, a first filter or a second filter or both are disposed, and characteristics of the first filter and the second filter are set. It can be learned from above that, disposing of the first filter and/or the second filter can achieve an objective that high frequency impedance basically remains in a same state during low frequency tuning, and resolve a problem that the high frequency impedance is affected and thus disorderly changes when the antenna system in the terminal tunes low frequency bandwidth.

Preferably, in the foregoing terminal, the antenna system includes the antenna body, the tunable component, and the first filter, and further includes a parasitic element, where the tunable component is connected to the antenna body by using the parasitic element; and a first end of the first filter is connected to the antenna body by using the parasitic element.

Preferably, in the foregoing terminal, the antenna system includes the antenna body, the tunable component, and the second filter, and further includes a parasitic element, where a first end of the second filter is connected to the antenna body by using the parasitic element; and the tunable component is connected to the antenna body by sequentially using the second filter and the parasitic element.

Preferably, in the foregoing terminal, the antenna system includes the antenna body, the tunable component, the first filter, and the second filter, and further includes a parasitic element, where a first end of the first filter is connected to the antenna body by using the parasitic element, a first end of the second filter is connected to the antenna body by using the parasitic element, and the tunable component is connected to the antenna body by sequentially using the second filter and the parasitic element.

Preferably, in the foregoing terminal, the first filter is a single capacitor or an LC network that includes an inductor and a capacitor.

Preferably, in the foregoing terminal, the second filter is a single inductor or an LC network that includes an inductor and a capacitor.

Preferably, in the foregoing terminal, the antenna body is an IFA antenna or a monopole antenna.

It should be noted that, for a structural diagram of the antenna system in the terminal, reference may be made to accompanying drawings in the foregoing antenna embodiments, and details are not described herein.

A person skilled in the art may understand that the accompanying drawings are merely schematic diagrams of exemplary embodiments, and modules in the accompanying drawings are not necessarily required for implementing the present invention.

The embodiments disclosed are described in the foregoing to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:

1. An antenna system, comprising:

an antenna body having one or more connection points between the antenna body and a ground;

a tunable component having a changeable operating parameter that is changeable, by a switch of the tunable component, between a capacitance and an inductance; and a second filter, wherein the antenna body is connected to the second filter through a first connection point;

wherein the second filter is connected in series between the antenna body and the tunable component in a manner that a first end of the second filter is connected to the antenna body and a second end of the second filter is connected to the tunable component, and wherein the second filter presents a low impedance characteristic in a low frequency band, and presents a high impedance characteristic in a high frequency band; and wherein the second filter is connected to the ground through the tunable component.

2. The antenna system according to claim 1, wherein the tunable component comprises an inductor and a capacitor.

3. The antenna system according to claim 1, wherein the second filter is at least one of an inductor or an inductive-capacitive (LC) network comprising an inductor and a capacitor.

4. The antenna system according to claim 1, wherein the antenna system further comprises a parasitic element;

wherein the first end of the second filter is connected to the antenna body through the parasitic element; and wherein the tunable component is connected to the antenna body through the second filter and the parasitic element.

5. The antenna system according to claim 1, wherein the antenna body is at least one of an inverted F antenna (IFA) or a monopole antenna.

6. The antenna system according to claim 1, wherein:
the antenna system further comprises a first filter;
the first filter is directly connected to the antenna body;
the first filter is connected in parallel with the tunable component;
a first end of the first filter is connected to the antenna body; and
a second end of the first filter is connected to the ground.

7. The antenna system according to claim 6, wherein the first filter is at least one of a capacitor or an inductive-capacitive (LC) network comprising an inductor and a capacitor.

8. The antenna system according to claim 6, wherein one ground point is connected to the antenna body through the first connection point, and in parallel with the tunable component and the first filter.

9. The antenna system according to claim 6, wherein the antenna system is configured to limit, due to high impedance of the first filter, a radio frequency current at the first connection point to passing through the tunable component branch when the antenna system operates in the low frequency band; and
wherein the antenna system is further configured, when the antenna system operates in the high frequency band, to effectively connect the radio frequency current to a ground point mainly through the first filter due to low impedance of the first filter.

10. The antenna system according to claim 1, wherein the antenna system further comprises an excitation point for connecting to a signal, and one or more ground points.

11. The antenna system according to claim 1, wherein one ground point is connected to the antenna body through the first connection point and in parallel with the tunable component.

12. A terminal, comprising the antenna system of claim 1.

13. The antenna system according to claim 1, wherein the antenna system is configured to connect a radio frequency current at the first connection point to the tunable component when the antenna system operates in the low frequency band such that the radio frequency current is unaffected by the second filter; and
wherein the antenna system is further configured to block, when the antenna system operates in the high frequency band, connection of the radio frequency current to the tunable component due to the high impedance characteristic of the second filter.

14. An antenna system, comprising
an antenna body;
a tunable component having a changeable operating parameter that is changeable, by a switch of the tunable component, between a capacitance and an inductance, wherein the antenna body is connected to the tunable component through a first connection point;
a parasitic element; and
a second filter, wherein:
the antenna body is connected to the second filter through the first connection point;
the second filter is connected in series between the antenna body and the tunable component in a manner that a first end of the second filter is connected to the antenna body and a second end of the second filter is connected to the tunable component;
the second filter presents a low impedance characteristic in a low frequency band, and presents a high impedance characteristic in a high frequency band;
the second end of the second filter is connected to ground through the tunable component;
the parasitic element is connected to the antenna body; and
the first end of the second filter is connected to the antenna body through the parasitic element.

15. The antenna system according to claim 14, wherein:
the antenna system further comprises a first filter;
the first filter is connected in parallel to the tunable component;
a first end of the first filter is connected to the second filter;
a second end of the first filter is connected to a ground; and
the first filter presents a first impedance property that is the high impedance characteristic in the low frequency band, and that is the low impedance characteristic in the high frequency band.

16. The antenna system according to claim 15, wherein the antenna system is configured to limit, due to high impedance of the first filter, a radio frequency current at the first connection point to passing through the tunable component branch when the antenna system operates in the low frequency band; and
wherein the antenna system is further configured, when the antenna system operates in the high frequency band, to effectively connect the radio frequency current to a ground point through the first filter due to low impedance of the first filter.

17. The antenna system according to claim 14, wherein the antenna system is configured to connect a radio frequency current at the first connection point to the tunable component when the antenna system operates in the low frequency band such that the radio frequency current is unaffected by the second filter; and
wherein the antenna system is further configured to block, when the antenna system operates in the high frequency band, connection of the radio frequency current to the tunable component due to the high impedance characteristic of the second filter.

* * * * *